US012706299B2

(12) United States Patent
Kim et al.

(10) Patent No.: US 12,706,299 B2
(45) Date of Patent: Aug. 11, 2026

(54) SECONDARY BATTERY

(71) Applicant: LG ENERGY SOLUTION, LTD., Seoul (KR)

(72) Inventors: Young Jae Kim, Daejeon (KR); Jung Woo Yoo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 747 days.

(21) Appl. No.: 17/914,051

(22) PCT Filed: May 17, 2021

(86) PCT No.: PCT/KR2021/006137
§ 371 (c)(1),
(2) Date: Sep. 23, 2022

(87) PCT Pub. No.: WO2021/235794
PCT Pub. Date: Nov. 25, 2021

(65) Prior Publication Data

US 2023/0117733 A1 Apr. 20, 2023

(30) Foreign Application Priority Data

May 20, 2020 (KR) ........................ 10-2020-0060532

(51) Int. Cl.
*H01M 4/134* (2010.01)
*H01M 4/02* (2006.01)
(Continued)

(52) U.S. Cl.
CPC ........... *H01M 4/134* (2013.01); *H01M 4/133* (2013.01); *H01M 4/366* (2013.01); *H01M 4/386* (2013.01);
(Continued)

(58) Field of Classification Search
CPC ...... H01M 4/134; H01M 4/133; H01M 4/366; H01M 4/386; H01M 4/621;
(Continued)

(56) References Cited

U.S. PATENT DOCUMENTS

2011/0217588 A1 9/2011 Roh et al.
2014/0363736 A1 12/2014 Kim et al.
(Continued)

FOREIGN PATENT DOCUMENTS

JP 2011-009228 A 1/2011
JP 2013178913 9/2013
(Continued)

OTHER PUBLICATIONS

JP2018055952A Translation (Year: 2018).*
(Continued)

*Primary Examiner* — Matthew T Martin
*Assistant Examiner* — Kevin Song
(74) *Attorney, Agent, or Firm* — Bryan Cave Leighton Paisner LLP

(57) ABSTRACT

Provided is a secondary battery which includes: one or more positive electrodes including a positive electrode active material layer; a plurality of negative electrodes including a first negative electrode including a silicon-based active material and a second negative electrode including a carbon-based active material; a separator; and an electrolyte, wherein the positive electrode and the negative electrode are alternately stacked with the separators interposed therebetween, and the ratio of weight of the silicon-based active material included in the first negative electrode and weight of the carbon-based active material included in the second negative electrode is in the range of 40:60 to 90:10.

15 Claims, 1 Drawing Sheet

(51) Int. Cl.
*H01M 4/133* (2010.01)
*H01M 4/36* (2006.01)
*H01M 4/38* (2006.01)
*H01M 4/62* (2006.01)

(52) U.S. Cl.
CPC ...... *H01M 4/621* (2013.01); *H01M 2004/027* (2013.01); *H01M 2004/028* (2013.01)

(58) Field of Classification Search
CPC ..... H01M 2004/027; H01M 2004/028; H01M 2010/4292; H01M 4/483; H01M 4/13; H01M 4/587; H01M 10/0525; H01M 10/0585; H01M 4/131; H01M 4/364; H01M 10/052; H01M 10/42; Y02E 60/10; Y02P 70/50
See application file for complete search history.

(56) References Cited

U.S. PATENT DOCUMENTS

| | | | | |
|---|---|---|---|---|
| 2016/0072125 | A1* | 3/2016 | Kimura | H01M 4/661 429/223 |
| 2017/0179482 | A1* | 6/2017 | Verbrugge | H01M 10/446 |
| 2020/0243848 | A1 | 7/2020 | Kim et al. | |
| 2021/0104750 | A1 | 4/2021 | Ito et al. | |
| 2024/0274804 | A1 | 8/2024 | Kim et al. | |

FOREIGN PATENT DOCUMENTS

| | | | | | |
|---|---|---|---|---|---|
| JP | 2016058236 | | | 4/2016 | |
| JP | 2018055952 | A | * | 4/2018 | |
| JP | 2018-170142 | A | | 11/2018 | |
| JP | 2018-181759 | A | | 11/2018 | |
| JP | 2019-114400 | A | | 7/2019 | |
| KR | 10-0794192 | B1 | | 1/2008 | |
| KR | 10-0812749 | B1 | | 3/2008 | |
| KR | 10-1265193 | B1 | | 5/2013 | |
| KR | 10-1515672 | B1 | | 4/2015 | |
| KR | 10-1558774 | B1 | | 10/2015 | |
| KR | 10-1599963 | B1 | | 3/2016 | |
| KR | 10-2017-0107213 | A | | 9/2017 | |
| KR | 10-2017-0109293 | A | | 9/2017 | |
| KR | 10-2019-0065172 | A1 | | 6/2019 | |
| WO | 2018155609 | | | 8/2018 | |
| WO | WO-2018155609 | A1 | * | 8/2018 | F16D 35/005 |
| WO | 2018179817 | | | 10/2018 | |

OTHER PUBLICATIONS

WO-2018155609-A1 Translation (Year: 2018).*

International Search Report (with partial translation) and Written Opinion dated Aug. 23, 2021, for corresponding International Patent Application No. PCT/KR2021/006137.

* cited by examiner

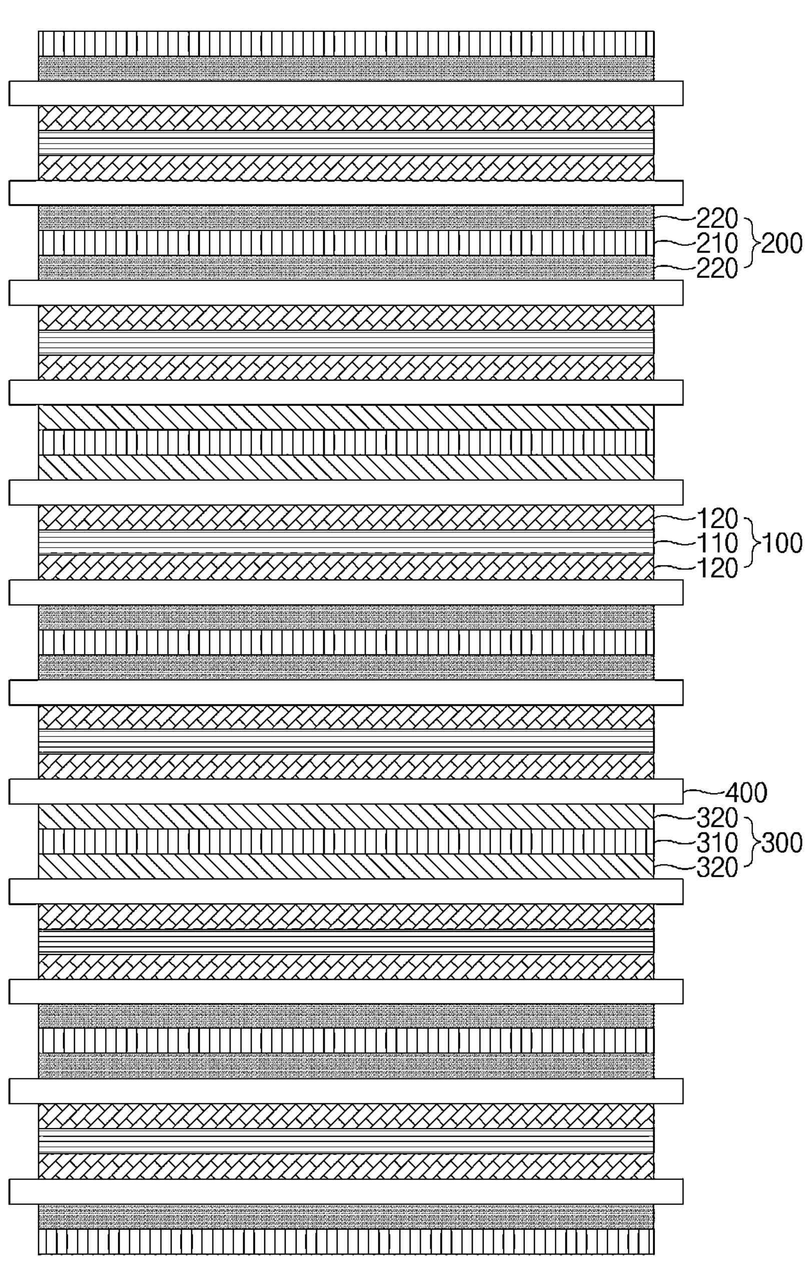
1
220
210
200
220
120
110
100
120
400
320
310
300
320

SECONDARY BATTERY

CROSS-REFERENCE TO RELATED APPLICATION

This application claims priority to and the benefit of Korean Patent Application No. 10-2020-0060532, filed on May 20, 2020, the disclosure of which is incorporated herein by reference in its entirety.

TECHNICAL FIELD

The present invention relates to a secondary battery, and more particularly, to a secondary battery having improved capacity characteristics, lifetime characteristics, and fast-charging characteristics.

BACKGROUND ART

With the recent rapid spread of electronic devices using a battery, such as mobile phones, notebook computers, and electric vehicles, the demand for small, lightweight, and relatively high-capacity secondary batteries is rapidly increasing. In particular, lithium secondary batteries have attracted attention as driving power sources for portable devices due to their light weight and high energy density. Accordingly, there have been active research and development efforts to improve the performance of lithium secondary batteries.

The lithium secondary batteries generally include a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$ or $LiMn_2O_4$ is used as a positive electrode active material in the positive electrode, and accordingly, a carbon-based active material or a silicon-based active material, which does not contain lithium, is used as a negative electrode active material in the negative electrode.

Among negative electrode active materials, silicon-based active materials are attracting attention because they have about 10 times higher capacity than carbon-based active materials and have excellent fast-charging characteristics. However, silicon-based active materials have the problem of volume expansion due to charging and discharging and degradation of lifetime characteristics caused thereby, and when a large amount of binder is used to suppress the problem, it is difficult to realize a desired high-capacity electrode. Therefore, silicon-based active materials are not widely used at present.

Meanwhile, carbon-based active materials such as artificial graphite and natural graphite exhibit relatively stable lifetime performance compared to silicon-based active materials, but when a carbon-based active material is applied with a large thickness to manufacture a high-capacity electrode, problems such as electrode cracking, warpage, delamination, and the like may occur.

In order to overcome the disadvantages of the carbon-based active materials and silicon-based active materials, techniques of manufacturing an electrode including a combination of a carbon-based active material and a silicon-based active material have been developed. However, since the influence of volume expansion of the silicon-based active material should be reduced, the proportion of the silicon-based active material used in the negative electrode cannot be increased to a desirable level, so it is difficult to improve the capacity characteristics and fast-charging characteristics of a negative electrode. In addition, when the proportion of the silicon-based active material is increased, the usage amount of binder should also be increased to suppress the volume expansion of the active material, so it is difficult to realize a high-capacity negative electrode.

Korean Patent Registration No. 10-0794192 relates to a method of manufacturing a carbon-coated silicon-graphite composite negative electrode material for a lithium secondary battery and a method of manufacturing a secondary battery including the same, but these methods have limitations in solving the above-described problems.

RELATED-ART DOCUMENT

Patent Document

Korean Patent Registration No. 10-0794192

DETAILED DESCRIPTION OF THE INVENTION

Technical Problem

The present invention is directed to providing a secondary battery having improved capacity characteristics, lifetime characteristics, and fast-charging characteristics.

Technical Solution

One aspect of the present invention provides a secondary battery, which includes: one or more positive electrodes including a positive electrode active material layer; a plurality of negative electrodes including a first negative electrode including a silicon-based active material and a second negative electrode including a carbon-based active material; a separator; and an electrolyte, wherein the positive electrode and the negative electrode are alternately stacked with the separators interposed therebetween, and a weight ratio of the silicon-based active material included in the first negative electrode to the carbon-based active material included in the second negative electrode is in a range of 40:60 to 90:10.

Advantageous Effects

A secondary battery of the present invention includes a first negative electrode including a silicon-based active material and a second negative electrode including a carbon-based active material, and a weight ratio of the silicon-based active material included in the first negative electrode to the carbon-based active material included in the second negative electrode is adjusted to be a specific ratio. According to the secondary battery of the present invention, since separate negative electrodes having different types of active materials having different characteristics are used, binders and conductive materials suitable for the characteristics of each of the active materials can be used in a desired amount, advantages of each of the silicon-based active material and the carbon-based active material can be maximized, and a secondary battery having excellent capacity and lifetime characteristics can be realized.

In addition, in the secondary battery of the present invention, a weight ratio of the silicon-based active material included in the first negative electrode to the carbon-based active material included in the second negative electrode is adjusted to be a specific weight ratio. Accordingly, since the charging potential of the silicon-based active material can be lowered to an appropriate level, the stress level of the silicon-based active material due to a sudden voltage change during charging and discharging can be reduced, and fast-charging characteristics can be improved.

DESCRIPTION OF DRAWINGS

FIGURE is an image for schematically illustrating a secondary battery of the present invention.

MODES OF THE INVENTION

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used in the present specification have been used only for the purpose of describing exemplary embodiments and are not intended to limit the present invention. Singular expressions include plural expressions unless the context clearly indicates otherwise.

It will be understood that terms such as “comprises,” “comprising,” “includes,” “including,” “has,” or “having,” when used in the present specification, specify the presence of stated features, numbers, steps, components, or combinations thereof and do not preclude the possibility of the presence or addition of one or more other features, numbers, steps, components, or combinations thereof.

In the present specification, an average particle diameter ($D_{50}$) is defined as a particle diameter corresponding to the 50% cumulative volume in a particle diameter distribution curve. The average particle diameter ($D_{50}$) may be measured using, for example, a laser diffraction method. The laser diffraction method generally allows for the measurement of a particle diameter ranging from a submicron level to several millimeters and can produce a result having high reproducibility and high resolution.

Hereinafter, a secondary battery of the present invention will be described in detail with reference to the accompanying drawing. In describing the present invention, when it is determined that a detailed description of a related known configuration or function may obscure the gist of the present invention, the detailed description may be omitted.

<Secondary Battery>

The present invention relates to a secondary battery 1, and more particularly, to a lithium secondary battery.

As shown in the FIGURE, the secondary battery 1 of the present invention includes: one or more positive electrodes 100 including a positive electrode active material layer 120; a plurality of negative electrodes 200, 300 including a first negative electrode 200 including a silicon-based active material and a second negative electrode 300 including a carbon-based active material; a separator 400; and an electrolyte (not shown), wherein the positive electrodes 100 and the negative electrodes 200, 300 are alternately stacked with the separators 400 interposed therebetween, and the ratio of weight of the silicon-based active material included in the first negative electrode 200 and weight of the carbon-based active material included in the second negative electrode 300 is in the range of 40:60 to 90:10.

Conventionally, silicon-based active materials have the advantageous of having high-capacity and fast-charging characteristics, but since the degree of volume expansion/contraction due to charging and discharging is large, rapid degradation of lifetime characteristics is an issue. Meanwhile, although a negative electrode including a combination of a silicon-based active material and a carbon-based active material has been developed, since the proportion of silicon-based active material used in a negative electrode should be lowered to control the volume expansion of the silicon-based active material, it is difficult to realize the high-capacity and fast-charging characteristics of the silicon-based active material.

In order to solve the problems, in the secondary battery of the present invention, a weight ratio of the silicon-based active material included in the first negative electrode 200 to the carbon-based active material included in the second negative electrode 300 is adjusted to be within the above-described range. In the secondary battery of the present invention, since the silicon-based active material in the first negative electrode 200 and the carbon-based active material in the second negative electrode 300 are used in the above-described weight ratio, the charging potential of the silicon-based active material can be lowered to a desirable level by the carbon-based active material, and therefore, the degree of volume expansion/contraction of the silicon-based active material during charging and discharging can be reduced, and the high-capacity and fast-charging characteristics of the silicon-based active material can be sufficiently exhibited.

In addition, the secondary battery of the present invention includes the first negative electrode 200 and the second negative electrode 300, which include the silicon-based active material and the carbon-based active material, respectively. Specifically, since the secondary battery of the present invention includes different types of negative electrodes including different active materials, negative electrode components can be included in compositions suitable for each negative electrode, and even when the proportion of the silicon-based active material used in the secondary battery is increased, the high-capacity characteristics and fast-charging characteristics of the silicon-based active material can be sufficiently exhibited without degradation of lifetime characteristics.

The secondary battery of the present invention 1 includes one or more positive electrodes 100. The positive electrode 100 includes a positive electrode active material layer 120.

Specifically, the positive electrode 100 may include a positive electrode current collector 110, and a positive electrode active material layer 120 formed on one or more surfaces of the positive electrode current collector 110.

The positive electrode current collector 110 is not particularly limited as long as it does not cause a chemical change in a battery and has high conductivity. Specifically, the positive electrode current collector 110 may include one or more selected from the group consisting of copper, stainless steel, aluminum, nickel, titanium, calcined carbon, and an aluminum-cadmium alloy.

The positive electrode current collector 110 may typically have a thickness of 3 μm to 500 μm.

The positive electrode current collector 110 may have fine irregularities formed in a surface thereof to increase the adhesion of a positive electrode active material. For example, the positive electrode current collector 110 may be used in any of various forms such as a film, a sheet, a foil, a net, a porous material, a foam, and a non-woven fabric.

The positive electrode active material layer 120 is formed on one or more surfaces of the positive electrode current collector 110. Specifically, the positive electrode active material layer 120 may be formed on one or both surfaces of the positive electrode current collector 110.

The positive electrode active material layer 120 may include a positive electrode active material.

The positive electrode active material may include a compound enabling the reversible intercalation and deintercalation of lithium and, specifically, may include a lithium-transition metal composite oxide including lithium and one or more selected from the group consisting of nickel, cobalt, manganese, and aluminum and preferably a lithium-transition metal composite oxide including lithium and a transition metal selected from the group consisting of nickel, cobalt, and manganese.

More specifically, the lithium-transition metal composite oxide may be, for example, a lithium-manganese-based oxide (e.g., $LiMnO_2$, $LiMn_2O_4$), a lithium-cobalt-based oxide (e.g., $LiCoO_2$), a lithium-nickel-based oxide (e.g., $LiNiO_2$), a lithium-nickel-manganese-based oxide (e.g., $LiNi_{1-Y}Mn_YO_2$ (here, $0<Y<1$), $LiMn_{2-z}Ni_zO_4$ (here, $0<Z<2$)), a lithium-nickel-cobalt-based oxide (e.g., $LiNi_{1-Y1}Co_{Y1}O_2$ (here, $0<Y1<1$)), a lithium-manganese-cobalt-based oxide (e.g., $LiCo_{1-Y2}Mn_{Y2}O_2$ (here, $0<Y2<1$), $LiMn_{2-Z1}Co_{Z1}O_4$ (here, $0<Z1<2$)), a lithium-nickel-manganese-cobalt-based oxide (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$)), or a lithium-nickel-cobalt-transition metal (M) oxide (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3, and s2 represent an atomic fraction of each independent element, and satisfy $0<p2<1$, $0<q2<1$, $0<r3<1$, $0<s2<1$, and $p2+q2+r3+s2=1$)), or a combination of one or more thereof. Among these, the lithium-transition metal composite oxide may be $LiCoO_2$, $LiMnO_2$, $LiNiO_2$, a lithium-nickel-manganese-cobalt oxide (e.g., $Li(Ni_{0.6}Mn_{0.2}Co_{0.2})_{02}$, $Li(Ni_{0.05}Mn_{0.3}Co_{0.2})_{02}$, $Li(Ni_{0.7}Mn_{0.15}Co_{0.15})O_2$, $Li(Ni_{0.05}Mn_{0.1}Co_{0.1})O_2$), a lithium-nickel-cobalt-aluminum oxide (e.g., $Li(Ni_{0.05}Co_{0.15}Al_{0.05})O_2$), or the like to improve the capacity characteristics and stability of a battery, and considering that the capacity characteristics and stability of a battery can be remarkably improved by controlling the types sand content ratio of elements constituting the lithium-transition metal composite oxide, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.5}Mn_{0.1}Co_{0.1})O_2$, or the like, and these compounds may be used alone or in combination of two or more thereof.

The positive electrode active material may be included in an amount of 80 wt % to 99 wt % and preferably 92 wt % to 98.5 wt % in the positive electrode active material layer so that the capacity of the positive electrode active material can be sufficiently realized.

The positive electrode active material layer 120 may include a positive electrode binder and/or a positive electrode conductive material in addition to the above-described positive electrode active material.

The positive electrode binder is a component that aids in the binding of an active material with a conductive material and the like and with a current collector, and specifically, may include one or more selected from the group consisting of polyvinylidene fluoride, polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), a sulfonated-EPDM, styrene-butadiene rubber, and fluororubber and preferably polyvinylidene fluoride.

The positive electrode binder may be included in an amount of 1 wt % to 20 wt % and preferably 1.2 wt % to 10 wt % in the positive electrode active material layer in terms of sufficiently securing binding between components such as the positive electrode active material.

The positive electrode conductive material may be used to assist and improve conductivity in a secondary battery, and is not particularly limited as long as it does not cause a chemical change and has conductivity. Specifically, the positive electrode conductive material may include one or more selected from the group consisting of: graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a polyphenylene derivative, and preferably includes carbon black in terms of improving conductivity.

The positive electrode conductive material may have a specific surface area of 80 $m^2/g$ to 200 $m^2/g$ and preferably 100 $m^2/g$ to 150 $m^2/g$ in terms of facilitating the dispersion of the positive electrode conductive material when preparing a slurry for forming the positive electrode active material layer and further improving electrical conductivity.

The positive electrode conductive material may be included in an amount of 1 wt % to 20 wt % and preferably 1.2 wt % to 10 wt % in the positive electrode active material layer in terms of sufficiently securing electrical conductivity.

The thickness of the positive electrode active material layer 120 may be in the range of 30 μm to 400 μm and preferably 40 μm to 110 μm. In the present specification, the thickness of the positive electrode active material layer may be the thickness of one positive electrode active material layer formed on one surface of the positive electrode current collector 110.

The porosity of the positive electrode 100 may be in the range of 20% to 35% and preferably 20 to 28%. The porosity of the positive electrode 100 may be determined using the porosity determination method of the following Mathematical Equation 1.

$$\text{Porosity of positive electrode (\%)} = \{1 - (\text{Electrode density of positive electrode}/\text{True density of positive electrode})\} \times 100 \quad \text{[Mathematical Equation 1]}$$

In the above Mathematical Equation 1, the true density of the positive electrode is the density of the positive electrode active material layer which is measured when the positive electrode having been provided in a predetermined size is pressed using pressing equipment until the thickness of the positive electrode no longer changes, and the electrode density of the positive electrode is the density of the positive electrode active material layer which is measured after the positive electrode is provided in a predetermined size.

The positive electrode 100 may be manufactured by applying a positive electrode slurry including the positive electrode active material and optionally a binder, a conductive material, and a solvent for forming a positive electrode slurry onto the positive electrode current collector 110, and performing roll-pressing and drying.

The solvent for forming a positive electrode slurry may include an organic solvent such as N-methyl-2-pyrrolidone (NMP), and may be used in an amount to have a preferable viscosity when the positive electrode active material and optionally a binder, a conductive material, and the like are included. For example, the solvent for forming a positive electrode slurry may be included in the positive electrode slurry such that the concentration of solids including the positive electrode active material and optionally a binder and a conductive material is in the range of 50 wt % to 95 wt % and preferably 70 wt % to 90 wt %.

There are a plurality of the negative electrodes, and the negative electrodes include a first negative electrode 200 and a second negative electrode 300. The negative electrode may include one or more, specifically, a plurality of the first negative electrodes 200 and the second negative electrodes 300.

The first negative electrode 200 includes a silicon-based active material, the second negative electrode 300 includes a carbon-based active material, and a weight ratio of the silicon-based active material included in the first negative electrode 200 to the carbon-based active material included in the second negative electrode 300 is in the range of 40:60 to 90:10. Specifically, when there are a plurality of first negative electrodes 200, "weight of silicon-based active material included in the first negative electrode 200" may mean the total weight of silicon-based active material included in the plurality of first negative electrodes 200, and when there are a plurality of second negative electrodes 300, "weight of carbon-based active material included in the second negative electrode 300" may mean the total weight of carbon-based active material included in the plurality of second negative electrodes 300. In this case, the ratio of the weight of silicon-based active material included in the first negative electrode 200 and the weight of carbon-based active material included in the second negative electrode 300 may mean the ratio of the total weight of silicon-based active material included in the plurality of first negative electrodes 200 and the total weight of carbon-based active material included in the plurality of second negative electrodes 300.

In the secondary battery of the present invention, the ratio of weight of the silicon-based active material included in the first negative electrode 200 and weight of the carbon-based active material included in the second negative electrode 300 is adjusted to be within the above-described range. In general, silicon-based active materials are known to have a higher charging potential than carbon-based active materials and have excellent fast-charging characteristics. However, due to the high charging potential of the silicon-based active materials, the silicon-based active materials undergo a large voltage change during charging and discharging, and accordingly, rapid volume expansion/contraction may occur, and lifetime characteristics may be rapidly degraded. In the secondary battery of the present invention, in which the silicon-based active material in the first negative electrode 200 and the carbon-based active material in the second negative electrode 300 are used in the above-described weight ratio, since the charging potential of the silicon-based active material can be lowered by the carbon-based active material to a desired level, the degree of volume expansion/contraction of the silicon-based active material during charging and discharging can be reduced, and the high-capacity and fast-charging characteristics of the silicon-based active material can be sufficiently exhibited.

In addition, the secondary battery of the present invention includes the first negative electrode 200 and the second negative electrode 300, which includes a silicon-based active material and a carbon-based active material, respectively. Specifically, since the secondary battery of the present invention includes different types of negative electrodes including different active materials, negative electrode components can be included with compositions suitable for each negative electrode, and even when the proportion of the silicon-based active material used in the secondary battery is increased, the high-capacity characteristics and fast-charging characteristics of the silicon-based active material can be sufficiently exhibited without degradation of lifetime characteristics.

When the weight of silicon-based active material is less than 40 wt % and the weight of carbon-based active material is more than 60 wt % based on the sum of weights of the silicon-based active material included in the first negative electrode 200 and the carbon-based active material included in the second negative electrode 300, the proportion of the carbon-based active material used in the entire negative electrode is increased. In this case, since the proportion of the carbon-based active material used in the entire negative electrode is increased, the capacity of the negative electrode is reduced, the overall N/P ratio (i.e., ratio $N_{all}/P_{all}$ to be described below) of the secondary battery is lowered, and the proportion of silicon-based active material used during the charging and discharging of the negative electrode is accordingly increased. In this case, since the effect of the volume expansion/contraction of the silicon-based active material on the secondary battery is increased, there is a risk that lifetime performance may be reduced. In addition, since the carbon-based active material has a very low potential during fast charging, and for example, may form a negative (−) potential, when the proportion of carbon-based active material used in the entire negative electrode is increased, lithium (Li)-plating may occur, which is also disadvantageous in terms of lifetime performance during fast charging.

When the weight of silicon-based active material is more than 90 wt % and the weight of carbon-based active material is less than 10 wt % based on the sum of weights of the silicon-based active material included in the first negative electrode 200 and the carbon-based active material included in the second negative electrode 300, since the proportion of the silicon-based active material is increased, the problem of volume expansion/contraction due to charging and discharging may be intensified, and there is a risk that lifetime performance may be reduced. In addition, when the proportion of silicon-based active material used in the entire negative electrode is excessively high, since the positive electrode 100 forms a high potential during battery operation due to the high potential of the silicon-based active material, the resistance of the positive electrode 100 may be increased, and accordingly, there is a risk that lifetime performance may be reduced.

In the secondary battery of the present invention, the ratio of weight of silicon-based active material included in the first negative electrode 200 and weight of carbon-based active material included in the second negative electrode 300 may be in the range of 40:60 to 90:10 and preferably 60:40 to 75:25, and when this range is satisfied, the fast-charging characteristics, capacity, and lifetime characteristics of the secondary battery can be further improved.

In the secondary battery of the present invention, the ratio of weight of silicon-based active material included in the first negative electrode 200 and weight of carbon-based active material included in the second negative electrode 300 may be realized by adjusting the amount of active material included in the first negative electrode 200 and the second negative electrode 300 or adjusting the number of the first negative electrodes 200 and the second negative electrodes 300, as shown in the FIGURE. Meanwhile, the FIGURE is only an exemplary illustration of first negative electrodes 200 and second negative electrodes 300, and the numbers of first negative electrodes and second negative electrode are not limited to those shown in the FIGURE.

The first negative electrode 200 includes a silicon-based active material. Specifically, the first negative electrode 200 may include only a silicon-based active material as an active material, and may not include a carbon-based active material.

The first negative electrode 200 includes a first negative electrode current collector 210 and a first negative electrode active material layer 220 formed on one or more surfaces of the first negative electrode current collector 210, and the first negative electrode active material layer 220 may include the above-described silicon-based active material.

The first negative electrode current collector 210 may include one or more selected from copper, stainless steel, aluminum, nickel, titanium, calcined carbon, and an aluminum-cadmium alloy, and preferably includes copper.

The thickness of the first negative electrode current collector 210 may be typically in the range of 3 μm to 500 μm and preferably 5 μm to 30 μm.

The first negative electrode current collector 210 may have fine irregularities formed in a surface thereof to increase the adhesion of the negative electrode active material. For example, the first negative electrode current collector may be used in any of various forms such as a film, a sheet, a foil, a net, a porous material, a foam, and a non-woven fabric.

The first negative electrode active material layer 220 is formed on one or more surfaces of the first negative electrode 200 current collector. Specifically, as shown in the FIGURE, the first negative electrode active material layer 220 may be formed on one or both surfaces of the first negative electrode current collector 210.

The first negative electrode active material layer 220 may include the above-described silicon-based active material.

The silicon-based active material may include a compound represented as $SiO_x$ ($0 \leq x < 2$). Since $SiO_2$ does not react with lithium ions and thus cannot store lithium, it is preferable that x satisfies the above range.

Specifically, the silicon-based active material may include Si. Although Si is usually advantageous in terms of having about 2.5 to 3 times higher capacity than silicon oxides (e.g., $SiO_x$ ($0<x<2$)), Si undergoes more severe volume expansion/contraction than silicon oxides due to charging and discharging and thus is relatively difficult to commercialize. However, in the case of the secondary battery of the present invention, although a silicon-based active material including Si is used, since the charging potential of the active material can be lowered to a desired level, the degradation of lifetime characteristics can be prevented, and at the same time, the high-capacity and fast-charging characteristics of the silicon-based active material can be improved. Specifically, the silicon-based active material may be mainly formed of Si, and more specifically, the silicon-based active material may be formed of Si.

The average particle diameter ($D_{50}$) of the silicon-based active material may be in the range of 1 μm to 10 μm and preferably 2 μm to 6 μm in terms of ensuring the structural stability of the active material during charging and discharging, enabling a conductive network for maintaining electrical conductivity to be more smoothly formed, or further increasing the accessibility of a binder used for binding an active material and a current collector.

The silicon-based active material may be included in an amount of 60 wt % to 90 wt % and preferably 70 wt % to 80 wt % in the first negative electrode active material layer in terms of minimizing the effect of the volume expansion/contraction of the silicon-based active material in a battery and sufficiently realizing the high capacity of the silicon-based active material in a secondary battery.

The first negative electrode active material layer 220 may include a first negative electrode binder and a first negative electrode conductive material in addition to the silicon-based active material.

The first negative electrode binder may be used to improve adhesion between the silicon-based active material and the negative electrode current collector or to increase bonding between the silicon-based active materials.

Specifically, the first negative electrode binder may include one or more selected from the group consisting of styrene-butadiene rubber (SBR), acrylonitrile-butadiene rubber, acrylic rubber, butyl rubber, fluororubber, polyvinyl alcohol (PVA), CMC, starch, hydroxypropyl cellulose, regenerated cellulose, polyacrylic acid (PAA), polyethylene glycol (PEG), polyacrylonitrile (PAN), and polyacrylamide (PAM).

Preferably, the first negative electrode binder includes one or more selected from the group consisting of PVA, PAA, PAN, and PAM and preferably PVA and PAA in terms of having high strength, excellent resistance to the volume expansion/contraction of the silicon-based active material, and being capable of preventing the distortion or warpage of the electrode by imparting excellent flexibility to the negative electrode. When the first negative electrode binder includes PVA and PAA, the first negative electrode binder may be a copolymer of PVA and PAA and specifically a copolymer of PVA and PAA having units derived from vinyl alcohol and units derived from acrylic acid in the weight ratio of 50:50 to 90:10 and preferably 55:45 to 80:20.

The first negative electrode binder may include a first negative electrode binder in which hydrogen therein is substituted with Li, Na, Ca, or the like, in terms of ensuring better dispersion in a water-based solvent such as water when preparing a slurry for forming the negative electrode active material layer, and improving bonding by more smoothly coating the active material.

The first negative electrode binder may be included in an amount of 5 wt % to 30 wt % and preferably 10 wt % to 20 wt % in the first negative electrode active material layer, and when the above range is satisfied, since the silicon-based active material can be smoothly bonded, the problem of active material volume expansion can be minimized, and at the same time, the negative electrode binder can be easily dispersed during the preparation of a slurry for forming the negative electrode active material layer, and the coating ability phase stability of the slurry can be improved.

The first negative electrode conductive material may be used to assist and improve conductivity in the secondary battery, and is not particularly limited as long as it does not cause a chemical change and has conductivity. Specifically, the first negative electrode conductive material may include one or more selected from the group consisting of: graphite such as natural graphite or artificial graphite; carbon black such as acetylene black, Ketjen black, channel black, furnace black, lamp black, or thermal black; a conductive fiber such as carbon fiber or metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a conductive material such as a polyphenylene derivative, and preferably includes carbon black in terms of realizing high conductivity.

The first negative electrode conductive material may have a specific surface area of 80 $m^2/g$ to 200 $m^2/g$ and preferably 100 $m^2/g$ to 150 $m^2/g$ in terms of facilitating the dispersion of the negative electrode conductive material during the preparation of a slurry for forming the negative electrode active material layer and further improving electrical conductivity.

The first negative electrode conductive material may be included in an amount of 5 wt % to 20 wt % and preferably 7 wt % to 15 wt % in the first negative electrode active material layer, and when the above range is satisfied, it is preferable because it is possible to form an excellent conductive network while mitigating an increase in resistance caused by the negative electrode binder.

The thickness of the first negative electrode active material layer 220 may be in the range of 10 μm to 100 μm and preferably 20 μm to 50 μm. In the present specification, the thickness of the first negative electrode active material layer 220 may be the thickness of one first negative electrode active material layer 220 formed on one surface of the first negative electrode current collector 210.

The porosity of the first negative electrode 200 may be in the range of 28% to 50% and preferably 32% to 40%, and when this range is satisfied, it is preferable because the volume expansion/contraction of the silicon-based active material can be appropriately accommodated and at the same time, as an appropriate level of contact between active materials can be maintained, conductivity can be improved.

In the present specification, the porosity of the first negative electrode 200 may be calculated by the following Mathematical Equation 2.

$$\text{Porosity of first negative electrode (\%)} = \{1 - (\text{Electrode density of first negative electrode} / \text{True density of first negative electrode})\} \times 100 \quad \text{[Mathematical Equation 2]}$$

In the Mathematical Equation 2, the true density of the first negative electrode is the density of the first negative electrode active material layer which is measured when the negative electrode having been provided in a predetermined size is pressed using pressing equipment until the thickness of the negative electrode no longer changes, and the electrode density of the first negative electrode is the density of the first negative electrode active material layer which is measured after the first negative electrode is provided in a predetermined size.

In the first negative electrode 200, the $N_1/P$ ratio calculated by the following Mathematical Equation a may be in the range of 2.2 to 3.0 and preferably 2.4 to 2.8.

$$N_1/P \text{ ratio} = \{(\text{Discharge capacity per unit area of one first negative electrode active material layer in the first negative electrode}) / (\text{Discharge capacity per unit area of one positive electrode active material layer in the positive electrode})\} \quad \text{[Mathematical Equation a]}$$

When the $N_1/P$ ratio of the first negative electrode is adjusted to be within the above range, the proportion of silicon-based active material used during operation of the first negative electrode can be lowered to an appropriate level, and therefore, the effect of volume expansion of the silicon-based active material in a secondary battery can be minimized.

The $N_1/P$ ratio may be determined by manufacturing a half-cell of each of the first negative electrode 200 and the positive electrode 100 and determining discharge capacity per unit area of the first negative electrode 200 and the positive electrode 100, and substituting the results into Mathematical Equation a.

The first negative electrode 200 may be manufactured by applying a negative electrode slurry including a silicon-based active material and optionally a first negative electrode binder, a first negative electrode conductive material, and a solvent for forming a negative electrode slurry onto the first negative electrode current collector, and performing roll-pressing and drying.

The solvent for forming a negative electrode slurry may include, for example, one or more selected from the group consisting of distilled water, ethanol, methanol, and isopropyl alcohol and preferably distilled water in terms of facilitating the dispersion of the negative electrode active material, the negative electrode binder, and/or the negative electrode conductive material.

The solvent for forming a negative electrode slurry may be included in the negative electrode slurry such that the concentration of solids in the negative electrode slurry is in the range of 15 wt % to 45 wt % and preferably 20 wt % to 30 wt % in consideration of the viscosity, coating ability, dispersibility of the negative electrode slurry and the like.

The second negative electrode 300 includes a carbon-based active material. Specifically, the second negative electrode 300 may include only a carbon-based active material as an active material, and may not include a silicon-based active material. Since the second negative electrode 300 includes the carbon-based active material, the overall charge potential of the negative electrode can be lowered, sudden volume expansion due to a silicon-based active material in the first negative electrode can be prevented.

Specifically, the second negative electrode 300 may include a second negative electrode current collector 310 and a second negative electrode active material layer 320 formed one or more surfaces of the second negative electrode current collector 310, and the second negative electrode active material layer 320 may include the above-described carbon-based active material.

The second negative electrode current collector 310 may include one or more selected from copper, stainless steel, aluminum, nickel, titanium, calcined carbon, and an aluminum-cadmium alloy, and preferably includes copper.

The thickness of the second negative electrode current collector 310 may be typically in the range of 3 μm to 500 μm and preferably 5 μm to 30 μm.

The second negative electrode current collector 310 may have fine irregularities formed in a surface thereof to increase the adhesion of the negative electrode active material. For example, the second negative electrode current collector 310 may be used in any of various forms such as a film, a sheet, a foil, a net, a porous material, a foam, and a non-woven fabric.

The second negative electrode active material layer 320 is formed on one or more surfaces of the second negative electrode current collector 310. Specifically, the second negative electrode active material layer 320 may be formed on one or both surfaces of the second negative electrode current collector 310.

The second negative electrode active material layer 320 may include the above-described carbon-based active material.

Specifically, the carbon-based active material may include one or more selected from the group consisting of artificial graphite, natural graphite, hard carbon, soft carbon, carbon black, graphene, and fibrous carbon, preferably one or more of artificial graphite and natural graphite, and more preferably artificial graphite and natural graphite.

The average particle diameter ($D_{50}$) of the carbon-based active material may be in the range of 10 μm to 30 μm and preferably 15 μm to 25 μm in terms of ensuring structural stability during charging and discharging and reducing side reactions with an electrolyte.

The carbon-based active material may be included in an amount of 90 wt % to 99 wt % and preferably 92 wt % to 98 wt % in the second negative electrode active material layer in terms of sufficiently exhibiting the capacity of the carbon-based active material.

The second negative electrode active material layer 320 may include a second negative electrode binder and a second negative electrode conductive material in addition to the carbon-based active material.

The second negative electrode binder may be used to improve adhesion between the carbon-based active material and a negative electrode current collector or to increase bonding between the carbon-based active materials.

Specifically, the second negative electrode binder may include one or more selected from the group consisting of a polyvinylidene fluoride-hexafluoropropylene copolymer (PVDF-co-HFP), polyvinylidene fluoride (PVDF), polyacrylonitrile, poly(methyl methacrylate), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, ethylene-propylene-diene monomer (EPDM) rubber, styrene-butadiene rubber (SBR), and fluororubber and preferably SBR in terms of improving adhesion between the carbon-based active material and a current collector.

The second negative electrode binder may be included in an amount of 0.5 wt % to 10 wt %, preferably 1 wt % to 5 wt %, and more preferably 1.5 wt % to 3.5 wt % in the second negative electrode active material layer.

The second negative electrode conductive material is not particularly limited as long as it does not cause a chemical change in the battery and has conductivity, and for example, graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a conductive material such as a polyphenylene derivative may be used.

The second negative electrode conductive material may be included in an amount of 0.5 wt % to 5 wt % in the second negative electrode active material layer.

The second negative electrode conductive material may have a specific surface area of 80 $m^2/g$ to 200 $m^2/g$ and preferably 100 $m^2/g$ to 150 $m^2/g$ in terms of facilitating the dispersion of the negative electrode conductive material during the preparation of a slurry for forming the negative electrode active material layer and further improving electrical conductivity.

The thickness of the second negative electrode active material layer 320 may be in the range of 20 μm to 200 μm and preferably 60 μm to 120 μm. In the present specification, the thickness of the second negative electrode active material layer 320 may be the thickness of one second negative electrode active material layer 320 formed on one surface of the negative electrode current collector 31.

The porosity of the second negative electrode 300 may be in the range of 20% to 40% and preferably 21% to 30%, and when this range is satisfied, it is preferable because electrolyte impregnation performance can be improved, and at the same time, energy density can be improved.

The porosity of the second negative electrode 300 may be calculated by applying Mathematical Equation 2, which is an equation for determining the porosity of the first negative electrode 200.

In the second negative electrode 300, the $N_2/P$ ratio calculated by the following Mathematical Equation b may be in the range of 1.0 to 1.3 and preferably 1.05 to 1.1.

$$N_2/P \text{ ratio} = \{(\text{Discharge capacity per unit area of one second negative electrode active material layer in the second negative electrode}) / (\text{Discharge capacity per unit area of one positive electrode active material layer in the positive electrode})\} \quad \text{[Mathematical Equation b]}$$

When the $N_2/P$ ratio of the second negative electrode is adjusted to be within the above range, it is preferable because stable performance can be obtained while using the entire potential region of the second negative electrode 300 and the positive electrode 100.

The $N_2/P$ ratio may be determined by manufacturing a half-cell of each of the second negative electrode 300 and the positive electrode 100 and determining discharge capacity per unit area of the second negative electrode 300 and the positive electrode 100, and substituting the results into Mathematical Equation b.

In the secondary battery of the present invention, the positive electrodes 100 and the negative electrodes 200, 300 may be alternately stacked. For example, as illustrated in the FIGURE, a positive electrode 100 may be disposed between a plurality of negative electrodes 200, 300, and in this case, the first negative electrodes 200 and the second negative electrodes 300 may be alternately stacked or randomly stacked.

In the secondary battery of the present invention, the $N_{all}/P_{all}$ ratio calculated by the following Mathematical Equation c may be in the range of 2 to 3, preferably 2.2 to 2.8, and more preferably 2.40 to 2.55, and when this range is satisfied, since the high-capacity and fast-charging characteristics of the silicon-based active material can be exhibited and at the same time, the effect of the volume expansion/contraction of the silicon-based active material can be minimized, the lifetime characteristics of the secondary battery can be further improved.

$$N_{all}/P_{all}\text{ ratio} = \{(\text{Sum of discharge capacity per unit area of the negative electrodes present in the secondary battery})/(\text{Sum of discharge capacity per unit area of the positive electrode present in the secondary battery})\} \quad \text{[Mathematical Equation c]}$$

Specifically, the $N_{all}/P_{all}$ ratio may be obtained by measuring discharge capacity per unit area of each of the plurality of negative electrodes present in the secondary battery and calculating the sum thereof, measuring discharge capacity per unit area of each of the plurality of positive electrodes present in the secondary battery and calculating the sum thereof, and then substituting values obtained in the above into Mathematical Equation c.

The separator 400 is interposed between the positive electrode 100 and the negative electrode 200, 300 as shown in the FIGURE. Specifically, the positive electrodes 100 and the negative electrodes 200, 300 are alternately stacked with the separator 400 interposed therebetween.

The separator 400 is used to separate the negative electrodes 200, 300 and the positive electrodes 100 and provide a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

Examples of the electrolyte (not shown) include, but are not limited to, an organic liquid electrolyte, an inorganic liquid electrolyte, a solid polymer electrolyte, a gel-type polymer electrolyte, an inorganic solid electrolyte, and a molten-type inorganic electrolyte which are usable for manufacturing a secondary battery.

Specifically, the electrolyte may include an organic solvent and a lithium salt.

As the organic solvent, any organic solvent that can serve as a medium through which ions involved in an electrochemical reaction of a battery can move may be used without particular limitation. Specifically, as the organic solvent, an ester-based solvent such as methyl acetate, ethyl acetate, γ-butyrolactone, tycaprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), or propylene carbonate (PC); an alcohol-based solvent such as ethyl alcohol or isopropyl alcohol; a nitrile such as R—CN (R is a C2-C20 hydrocarbon group with a linear, branched, or cyclic structure and may include a double-bonded aromatic ring or an ether linkage); an amide such as dimethylformamide; a dioxolane such as 1,3-dioxolane; or a sulfolane may be used. Among these, a carbonate-based solvent is preferable, and a combination of a cyclic carbonate having high ionic conductivity and a high dielectric constant, which is capable of improving the charging/discharging performance of a battery (e.g., EC or PC), and a linear carbonate-based compound having low viscosity (e.g., EMC, DMC, or DEC) is more preferable. In this case, when the cyclic carbonate and the linear carbonate are mixed in the volume ratio of about 1:1 to about 1:9 and used, electrolyte performance can be excellent.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used within a concentration range of 0.1 to 2.0 M. When the concentration of the lithium salt is within the above range, since the electrolyte has appropriate conductivity and viscosity, electrolyte performance can be excellent, and lithium ions can effectively move.

The secondary battery may be manufactured according to a conventional secondary battery manufacturing method, by interposing the separator between the above-described negative electrodes and positive electrodes and injecting an electrolyte.

The secondary battery of the present invention is useful in the field of portable devices such as mobile phones, laptop computers, and digital cameras, and electric vehicles (EVs), including hybrid electric vehicles (HEVs), and can be particularly preferably used as a constituent battery of a medium-to-large sized battery module.

The medium-to-large sized battery module can be preferably applied as a power source for EVs, HEVs, or power storage devices requiring high output and large capacity.

Hereinafter, exemplary embodiments of the present invention will be described in detail so that those of ordinary skill in the art can easily implement the present invention. However, the present invention may be implemented in various different forms and is not limited to the embodiments described herein.

EXAMPLES

Example 1: Manufacture of Secondary Battery

<Manufacture of Positive Electrode>

A positive electrode slurry (solids concentration: 78 wt %) was prepared by adding $Li[Ni_{0.6}Co_{0.2}Mn_{0.2}]O_2$ (average particle diameter ($D_{50}$): 15 μm) as a positive electrode active material, carbon black (product name: Super C65, manufacturer: TIMCAL) as a positive electrode conductive material, and PVDF as a positive electrode binder in the weight ratio of 97:1.5:1.5 to NMP used as a solvent for forming a positive electrode slurry.

To form a positive electrode active material layer (thickness: 54 μm), the positive electrode slurry was applied, with a loading amount of 454 mg/25 $cm^2$, onto both surfaces of an aluminum current collector (thickness: 12 μm) used as a positive electrode current collector, roll-pressed, and then dried for 10 hours in a vacuum oven at 130° C., and thereby a positive electrode of Example 1 was obtained (positive electrode thickness: 120 μm, porosity: 24%). A plurality (20) of the positive electrodes were manufactured.

<Manufacture of Negative Electrode>

1. Manufacture of First Negative Electrode

A negative electrode slurry (solids concentration: 25 wt %) was prepared by adding Si (average particle diameter ($D_{50}$): 3 μm) as a silicon-based active material, carbon black (product name: Super C65, manufacturer: TIMCAL) as a first negative electrode conductive material, and a PVA/PAA copolymer (includes units derived from vinyl alcohol and units derived from acrylic acid in the ratio of 66:34; weight-average molecular weight: approximately 360,000 g/mol) as a first negative electrode binder in the weight ratio of 75:10:15 to distilled water used as a solvent for forming a negative electrode slurry.

To form a first negative electrode active material layer (thickness: 26.5 μm, manufacturer: TIMCAL) as a first negative electrode conductive material, amg/25 $cm^2$, onto both surfaces of a copper current collector (thickness: 15 μm) used as a negative electrode current collector, roll-pressed, and then dried for 10 hours in a vacuum oven at 130° C., and thereby a first negative electrode A was obtained (negative electrode thickness: 68 μm, negative electrode porosity: 34%). A plurality (17) of the first negative electrodes A were manufactured.

A first negative electrode active material layer (thickness: 26.5 μm) was also formed by applying, with a loading amount of 91.8 mg/25 $cm^2$, the negative electrode slurry onto one surface of a copper current collector (thickness: 15 μm) used as a negative electrode current collector, roll-pressed, and then dried for 10 hours in a vacuum oven at 130° C., and thereby a first negative electrode B was obtained (negative electrode thickness: 41.5 μm, negative electrode porosity: 34%). A plurality (two) of the first negative electrodes B were manufactured.

The first negative electrodes A and the first negative electrodes B were used as first negative electrodes.

2. Manufacture of Second Negative Electrode

A negative electrode slurry (solids concentration: 48 wt %) was prepared by adding a 90:10 (w/w) mixture of artificial graphite (average particle diameter ($D_{50}$): 15 μm) and natural graphite (average particle diameter ($D_{50}$): 18 μm) as a carbon-based active material, carbon black (product name: Super C65, manufacturer: TIMCAL) as a second negative electrode conductive material, SBR as a second negative electrode binder, and CMC as a thickener in the weight ratio of 95.65:0.75:1.1:2.5 to distilled water used as a solvent for forming a negative electrode slurry.

To form a second negative electrode active material layer (thickness: 74 μm), the negative electrode slurry was applied, with a loading amount of 298 mg/25 $cm^2$, onto both surfaces of a copper current collector (thickness: 8 μm) used as a negative electrode current collector, roll-pressed, and then dried for 10 hours in a vacuum oven at 130° C., and thereby a second negative electrode was obtained (negative electrode thickness: 156 μm, negative electrode porosity: 27%). A plurality (two) of the second negative electrodes were manufactured.

<Manufacture of Secondary Battery>

1. Manufacture of Secondary Battery

A secondary battery was manufactured by alternately stacking the negative electrodes (first negative electrodes and second negative electrodes) and the positive electrodes so that the electrodes were spaced apart from one another with a polyethylene separator interposed therebetween, and injecting an electrolyte. Two first negative electrodes B were disposed in outermost parts of the secondary battery so that first negative electrode active material layers were disposed to face positive electrode active material layers of positive electrodes. The first negative electrodes A and the second negative electrodes were alternately stacked with the positive electrodes so that their negative electrode active material layers faced positive electrode active material layers of the positive electrodes.

As the electrolyte, an electrolyte prepared by adding, to an organic solvent formed of fluoroethylene carbonate (FEC) and DMC in the volume ratio of 30:70, 3 wt % (based on the total weight of electrolyte) vinylene carbonate and 1 M $LiPF_6$ as a lithium salt was used.

In the secondary battery, there were 17 first negative electrodes A, 2 first negative electrodes B, 2 second negative electrodes, and 20 positive electrodes. The ratio of weight of the silicon-based active material included in the first negative electrodes (first negative electrodes A and first negative electrodes B) and weight of the carbon-based active material included in the second negative electrode was 68.5:31.5. Meanwhile, the ratio of the total weight of the first negative electrodes and the total weight of the second negative electrodes was 90:10.

2. N/P Ratio (1) $N_1$/P Ratio

A negative electrode for measuring a N/P ratio was manufactured in the same manner as in the method of manufacturing the first negative electrode A, except that a negative electrode active material layer was formed on only one surface of a copper current collector. A coin-type half-cell including the negative electrode for measuring a N/P ratio, a lithium metal counter electrode opposite to the negative electrode for measuring a N/P ratio, a polyethylene separator interposed between the negative electrode for measuring a N/P ratio and the lithium metal counter electrode, and an electrolyte was manufactured, and discharge capacity was measured (units: mAh/g). By multiplying the discharge capacity by a loading amount (91.8 mg/25 $cm^2$=3.67 mg/$cm^2$=0.00367 g/$cm^2$), "discharge capacity per unit area of one first negative electrode active material layer in the first negative electrode" was determined (units: mAh/$cm^2$).

A positive electrode for measuring a N/P ratio was manufactured in the same manner as in the method of manufacturing the positive electrode, except that a positive electrode active material layer was formed on only one surface of an aluminum current collector. A coin-type half-cell including the positive electrode for measuring a N/P ratio, a lithium metal counter electrode opposite to the positive electrode for measuring a N/P ratio, a polyethylene separator interposed between the positive electrode for measuring a N/P ratio and the lithium metal counter electrode, and an electrolyte was manufactured, and discharge capacity was measured (units: mAh/g). By multiplying the discharge capacity by a loading amount (454 mg/25 $cm^2$=18.16 mg/$cm^2$=0.01816 g/$cm^2$), "discharge capacity per unit area of one positive electrode active material layer in the positive electrode" was determined (units: mAh/$cm^2$).

An $N_1/P$ ratio was determined by the following Mathematical Equation a, and a $N_1/P$ ratio of the secondary battery of Example 1 was 2.69.

$$N_1/P \text{ ratio} = \{(\text{Discharge capacity per unit area of one first negative electrode active material layer in the first negative electrode}) / (\text{Discharge capacity per unit area of one positive electrode active material layer in the positive electrode})\} \quad \text{[Mathematical Equation a]}$$

(2) $N_2/P$ Ratio

A negative electrode for measuring a N/P ratio was manufactured in the same manner as in the method of manufacturing the second negative electrode, except that a negative electrode active material layer was formed on only one surface of a copper current collector. A coin-type half-cell including the negative electrode for measuring a N/P ratio, a lithium metal counter electrode opposite to the negative electrode for measuring a N/P ratio, a polyethylene separator interposed between the negative electrode for measuring a N/P ratio and the lithium metal counter electrode, and an electrolyte was manufactured, and discharge capacity was measured (units: mAh/g). By multiplying the discharge capacity by a loading amount (298 mg/25 $cm^2$=11.92 mg/$cm^2$=0.01192 g/$cm^2$), "discharge capacity per unit area of one second negative electrode active material layer in the second negative electrode" was determined (units: mAh/$cm^2$).

A positive electrode for measuring a N/P ratio was manufactured in the same manner as in the method of manufacturing the positive electrode, except that a positive electrode active material layer was formed on only one surface of an aluminum current collector. A coin-type half-cell including the positive electrode for measuring a N/P ratio, a lithium metal counter electrode opposite to the positive electrode for measuring a N/P ratio, a polyethylene separator interposed between the positive electrode for measuring a N/P ratio and the lithium metal counter electrode, and an electrolyte was manufactured, and discharge capacity was measured (units: mAh/g). By multiplying the discharge capacity by a loading amount (454 mg/25 $cm^2$=18.16 mg/$cm^2$=0.01816 g/$cm^2$), "discharge capacity per unit area of one positive electrode active material layer in the positive electrode" was determined (units: mAh/$cm^2$).

An $N_2/P$ ratio was determined by the following Mathematical Equation b, and a $N_2/P$ ratio of the secondary battery of Example 1 was 1.08.

$$N_2/P \text{ ratio} = \{(\text{Discharge capacity per unit area of one second negative electrode active material layer in the second negative electrode}) / (\text{Discharge capacity per unit area of one positive electrode active material layer in the positive electrode})\} \quad \text{[Mathematical Equation b]}$$

(3) $N_{all}/P_{all}$ Ratio

An $N_{all}/P_{all}$ ratio was calculated by the following method.

The sum of discharge capacity of the first negative electrodes was determined by multiplying the "discharge capacity per unit area of one first negative electrode active material layer in the first negative electrode" determined in (1) by the number of first negative electrode active material layers in the secondary battery of Example 1. The sum of discharge capacity of second negative electrodes was determined by multiplying the "discharge capacity per unit area of one second negative electrode active material layer in the second negative electrode" determined in (2) by the number of second negative electrode active material layers in the secondary battery of Example 1. By adding the sum of discharge capacity of first negative electrodes and the sum of discharge capacity of second negative electrodes, the sum of discharge capacity of negative electrodes present in the secondary battery of Example 1 was determined.

By multiplying the "discharge capacity per unit area of one positive electrode active material layer in the positive electrode" determined in (1) by the number of positive electrode active material layers in the secondary battery of Example 1, the sum of discharge capacity of positive electrodes present in the secondary battery of Example 1 was determined.

The $N_{all}/P_{all}$ ratio was determined by the following Mathematical Equation c, and a $N_{all}/P_{all}$ ratio of Example 1 was 2.53.

$$N_{all}/P_{all} \text{ ratio} = \{(\text{Sum of discharge capacity per unit area of the negative electrodes present in the secondary battery}) / (\text{Sum of discharge capacity per unit area of the positive electrode present in the secondary battery})\} \quad \text{[Mathematical Equation c]}$$

Example 2: Manufacture of Secondary Battery

A secondary battery of Example 2 was manufacture in the same manner as in Example 1 except that 15 first negative electrodes A, 2 first negative electrodes B, 4 second negative electrodes, and 20 positive electrodes were prepared for manufacturing the secondary battery.

In Example 2, the ratio of weight of silicon-based active material in the first negative electrode and weight of carbon-based active material in the second negative electrode was 49.2:50.8, and the ratio of the total weight of the first negative electrodes and the total weight of the second negative electrodes was 80:20.

A $N_{all}/P_{all}$ ratio of the secondary battery of Example 2 was 2.37.

Example 3: Manufacture of Secondary Battery

A secondary battery of Example 3 was manufactured in the same manner as in Example 1 except that 18 first negative electrodes A, 2 first negative electrodes B, 1 second negative electrode, and 20 positive electrodes were prepared for manufacturing the secondary battery.

In Example 3, the ratio of weight of silicon-based active material in the first negative electrodes and weight of carbon-based active material in the second negative electrode was 82.1:17.9, and the ratio of the total weight of the first negative electrodes and the total weight of the second negative electrode was 95:5.

A $N_{all}/P_{all}$ ratio of the secondary battery of Example 3 was 2.61.

Comparative Example 1: Manufacture of Secondary Battery

A secondary battery of Comparative Example 1 was manufactured in the same manner as in Example 1 except that 19 first negative electrodes A, 2 first negative electrodes B, and 20 positive electrodes were alternately stacked without using a second negative electrode.

In Comparative Example 1, the ratio of weight of silicon-based active material in the first negative electrodes and weight of carbon-based active material in the second negative electrodes was 100:0, and the ratio of the total weight of the first negative electrodes and the total weight of the second negative electrodes was 100:0.

A $N_{all}/P_{all}$ ratio of the secondary battery of Comparative Example 1 was 2.69.

Comparative Example 2: Manufacture of Secondary Battery

A secondary battery of Comparative Example 2 was manufactured in the same manner as in Example 1 except that 11 first negative electrodes A, 2 first negative electrodes B, 8 second negative electrodes, and 20 positive electrodes were prepared for manufacturing the secondary battery.

In Comparative Example 2, the ratio of weight of silicon-based active material in the first negative electrodes and weight of carbon-based active material in the second negative electrodes was 26.6:73.4, and the ratio of the total weight of the first negative electrodes and the total weight of the second negative electrodes was 60:40.

A $N_{all}/P_{all}$ ratio of the secondary battery of Comparative Example 2 was 2.04.

Comparative Example 3: Manufacture of Secondary Battery

A secondary battery of Comparative Example 3 was manufactured in the same manner as in Example 1 except that 7 first negative electrodes A, 2 first negative electrodes B, 12 second negative electrodes, and 20 positive electrodes were prepared for manufacturing the secondary battery.

In Comparative Example 3, the ratio of weight of silicon-based active material in the first negative electrodes and weight of carbon-based active material in the second negative electrodes was 13.9:86.1, and the ratio of the total weight of the first negative electrodes and the total weight of the second negative electrodes was 40:60.

A $N_{all}/P_{all}$ ratio of the secondary battery of Comparative Example 3 was 1.72.

Comparative Example 4: Manufacture of Secondary Battery

A secondary battery of Comparative Example 4 was manufactured in the same manner as in Example 1 except that two negative electrodes, which were manufactured in the same manner as the second negative electrode except that a first negative electrode was not used and a second negative electrode active material layer was formed on only one surface rather than both surfaces, were disposed in outermost parts and 19 second negative electrodes and 20 positive electrodes were alternately stacked between the two negative electrodes.

In Comparative Example 4, the ratio of weight of silicon-based active material in the first negative electrodes and weight of carbon-based active material in the second negative electrodes was 0:100, and the ratio of the total weight of the first negative electrodes and the total weight of the second negative electrodes was 0:100.

A $N_{all}/P_{all}$ ratio of the secondary battery was 1.08.

Comparative Example 5: Manufacture of Secondary Battery

<Manufacture of Negative Electrode>

A 68.5:31.5 (w/w) mixture of a Si as a silicon-based active material (average particle diameter ($D_{50}$): 3 μm) and a carbon-based active material was used as a negative electrode active material. In this case, a 90:10 (w/w) mixture of artificial graphite (average particle diameter ($D_{50}$): 15 μm) and natural graphite (average particle diameter ($D_{50}$): 18 μm) was used as the carbon-based active material.

A negative electrode slurry (solids concentration: 25 wt %) was prepared by adding the negative electrode active material, carbon black (product name: Super C65, manufacturer: TIMCAL) as a negative electrode conductive material, and a PVA/PAA copolymer (includes units derived from vinyl alcohol and units derived from acrylic acid in the ratio of 66:34; weight-average molecular weight: approximately 360,000 g/mol) as a negative electrode binder in the weight ratio of 75:10:15 to distilled water used as a solvent for forming a negative electrode slurry.

To form a negative electrode active material layer (thickness: 29.5 μm), the negative electrode slurry was applied, with a loading amount of 100.5 mg/25 cm$^2$, onto both surfaces of a copper current collector (thickness: 15 μm) used as a negative electrode current collector, roll-pressed, and the dried for 10 hours in a vacuum oven at 130° C., and thereby a first negative electrode was obtained (negative electrode thickness: 44.5 μm in a vacuum oven at 130 rial, carbon black (product name: Super C65, manufacturer: TIMCAL) as manufactured.

<Manufacture of Secondary Battery>

A secondary battery of Comparative Example 5 was manufactured in the same manner as in Example 1 except that the negative electrodes manufactured in the above were used instead of the first negative electrodes and the second negative electrodes, and 21 negative electrodes manufactured in the above and 20 positive electrodes were prepared for manufacturing the secondary battery.

A $N_{all}/P_{all}$ ratio of the secondary battery of Comparative Example 5 was 2.68.

Comparative Example 6: Manufacture of Secondary Battery

<Manufacture of Negative Electrode>

A 68.5:31.5 (w/w) mixture of a Si (average particle diameter ($D_{50}$): 3 μm) as a silicon-based active material and a carbon-based active material was used as a negative electrode active material. In this case, a 90:10 (w/w) mixture of artificial graphite (average particle diameter ($D_{50}$): 15 μm) and natural graphite (average particle diameter ($D_{50}$): 18 μm) was used as the carbon-based active material.

A negative electrode slurry (solids concentration: 48 wt %) was prepared by adding the negative electrode active material, carbon black (product name: Super C65, manufacturer: TIMCAL) as a negative electrode conductive material, SBR as a negative electrode binder, and CMC as a thickener in the weight ratio of 95.65:0.75:1.1:2.5 to distilled water used as a solvent for forming a negative electrode slurry.

To form a negative electrode active material layer (thickness: 23 μm), the negative electrode slurry was applied, with a loading amount of 81.8 mg/25 $cm^2$, onto both surfaces of a copper current collector (thickness: 15 μm) used as a negative electrode current collector, roll-pressed, and then dried for 10 hours in a vacuum oven at 130° C., and thereby a first negative electrode was obtained (negative electrode thickness: 61 μm, negative electrode porosity: 35.4%). A plurality (21) of the negative electrodes were manufactured.

<Manufacture of Secondary Battery>

A secondary battery of Comparative Example 6 was manufactured in the same manner as in Example 1 except that the negative electrodes manufactured in the above were used instead of the first negative electrodes and the second negative electrodes, and 21 negative electrodes manufactured in the above and 20 positive electrodes were prepared for manufacturing the secondary battery.

A $N_{all}/P_{all}$ ratio of the secondary battery of Comparative Example 6 was 2.78.

TABLE 1

| | Weight ratio of silicon-based active material in first negative electrodes and carbon-based active material in second negative electrodes | $N_{all}/P_{all}$ ratio |
|---|---|---|
| Example 1 | 68.5:31.5 | 2.53 |
| Example 2 | 49.2:50.8 | 2.37 |
| Example 3 | 82.1:17.9 | 2.61 |
| Comparative Example 1 | 100:0 | 2.69 |
| Comparative Example 2 | 26.6:73.4 | 2.04 |
| Comparative Example 3 | 13.9:86.1 | 1.72 |
| Comparative Example 4 | 0:100 | 1.08 |
| Comparative Example 5 | — | 2.68 |
| Comparative Example 6 | — | 2.78 |

Experimental Example 1: Evaluation of Initial Efficiency and Capacity Retention Rate The initial efficiency and capacity retention rate of each of the secondary batteries manufactured in Examples 1 to 3 and Comparative Examples 1 to 6 were evaluated using an electrochemical charger/discharger.

The secondary batteries were 1) charged (0.2 C, constant current/constant voltage (CC/CV) charging, 4.2 V, 0.05 C cut-off) and discharged (0.2 C, constant current (CC) discharging, 3.2 V cut-off) for a first cycle, and then 2) charged (1.0 C, CC/CV charging, 4.2 V, 0.05 C cut-off) and discharged (0.5 C, CC discharging, 3.0 V cut-off) for a second cycle to a $100^{th}$ cycle.

The capacity retention rate was determined by the following equation. The results are shown in the following Table 2.

$$\text{Capacity retention rate (\%)} = \{(\text{Discharge capacity at } 100^{th} \text{ cycle})/(\text{Discharge capacity at first cycle})\} \times 100$$

TABLE 2

| | Capacity retention rate (%) @ $100^{th}$ cycle |
|---|---|
| Example 1 | 94.4 |
| Example 2 | 91.6 |
| Example 3 | 92.8 |
| Comparative Example 1 | 89.1 |
| Comparative Example 2 | 79.3 |
| Comparative Example 3 | 85.7 |
| Comparative Example 4 | 90.9 |
| Comparative Example 5 | 88.6 |
| Comparative Example 6 | 35.7 |

Referring to Table 2, it can be seen that the secondary batteries of Examples 1 to 3, which include first negative electrodes including a silicon-based active material and second negative electrodes including a carbon-based active material and in which the silicon-based active material included in the first negative electrodes and the carbon-based active material included in the second negative electrodes are in a specific weight ratio, exhibited excellent capacity, initial efficiency, and lifetime performance.

However, in the case of Comparative Example 1, since the negative electrode includes only a silicon-based active material as an active material, a high potential was also formed in a positive electrode active material in the same operating voltage range as Examples due to the high potential of the silicon-based active material. Accordingly, it is determined that, in the case of Comparative Example 1, since the resistance of the positive electrode increased as the potential of the positive electrode increased, Comparative Example 1 had lower lifetime performance than Examples.

In addition, in the case of Comparative Examples 2 and 3, as the proportion of carbon-based active material used in a negative electrode increased, the overall N/P ratios ($N_{all}/P_{all}$ ratio) of the secondary batteries were lowered. In this case, since the proportion of a negative electrode active material involved in charging and discharging in the negative electrodes increased, the effect of the volume expansion/contraction of a silicon-based active material on the secondary batteries increased, so lifetime performance was degraded.

In the case of Comparative Example 4, since the negative electrode includes only a carbon-based active material as an active material, lifetime performance was not significantly reduced compared to Examples, but energy density and fast-charging performance were significantly lowered. Therefore, Comparative Example 4 is not suitable for use as a secondary battery requiring fast-charging characteristics and high energy density.

In the case of Comparative Example 5, since the binder content of a negative electrode composition was increased, it was possible to control the volume expansion of a silicone-based active material to some extent, but since high resistance occurred in a carbon-based active material due to the increased binder content of the negative electrode composition, lifetime performance was reduced. On the other hand, in the case of Comparative Example 6, since the binder content of a negative electrode composition was low, it was difficult to control the volume expansion/contraction of a silicon-based active material, so lifetime performance was reduced. Therefore, in the secondary batteries of Comparative Examples 5 and 6, since one negative electrode includes both a silicon-based active material and a carbon-based active material, it was not possible to adjust a negative electrode composition according to characteristics of each active material, so the secondary batteries of Comparative Examples 5 and 6 had lower lifetime performance than the secondary batteries of Examples.

Experimental Example 2: Evaluation of Fast-Charging Lifetime

The capacity retention rate of each of the secondary batteries manufactured in Examples 1 to 3 and Comparative Examples 1 to 6 during fast charging was evaluated using an electrochemical charger/discharger. The secondary batteries were 1) charged (0.2 C, CC/CV charging, 4.2 V, 0.05 C cut-off) and discharged (0.2 C, CC discharging, 3.2 V cut-off) for a first cycle, and then 2) charged (2.0 C, CC/CV charging, 4.2 V, 0.05 C cut-off) and discharged (0.5 C, CC discharging, 3.2 V cut-off) for a second cycle to a $100^{th}$ cycle.

The capacity retention rates were determined by the following equation. The results are shown in the following Table 3.

$$\text{Capacity retention rate (\%)} = \{(\text{Discharge capacity at } 100^{th} \text{ cycle})/(\text{Discharge capacity at first cycle})\} \times 100$$

TABLE 3

| | Capacity retention rate (%) @ $100^{th}$ cycle |
|---|---|
| Example 1 | 89.0 |
| Example 2 | 85.2 |
| Example 3 | 87.9 |
| Comparative Example 1 | 83.5 |
| Comparative Example 2 | 61.1 |
| Comparative Example 3 | 58.4 |
| Comparative Example 4 | 53.2 |
| Comparative Example 5 | 73.1 |
| Comparative Example 6 | 22.2 |

Referring to Table 3, it can be seen that the secondary batteries of Examples 1 to 3, which include first negative electrodes including a silicon-based active material and second negative electrodes including a carbon-based active material and in which the silicon-based active material included in the first negative electrodes and the carbon-based active material included in the second negative electrodes are in a specific weight ratio, exhibited excellent lifetime performance during fast charging.

However, in the case of Comparative Example 1, since the negative electrode includes only a silicon-based active material as an active material, a high potential was also formed in a positive electrode active material in the same operating voltage range as Examples due to the high potential of the silicon-based active material. Accordingly, it is determined that, in the case of Comparative Example 1, since the resistance of a positive electrode increased as the potential of the positive electrode increased, Comparative Example 1 had lower fast-charging lifetime performance than Examples.

In addition, a carbon-based active material has a very low potential during fast charging, and for example, may form a negative (−) potential. Therefore, in the case of Comparative Examples 2, 3, and 4 in which a carbon-based active material was used in a high proportion, lifetime performance was significantly degraded due to the possibility of Li-plating and the like occurring during fast charging.

In the case of Comparative Example 5, since the binder content of a negative electrode composition was increased, it was possible to control the volume expansion of a silicone-based active material to some extent, but since high resistance occurred in a carbon-based active material due to the increased binder content of the negative electrode composition, fast-charging lifetime performance was reduced. On the other hand, in the case of Comparative Example 6, since the binder content of the negative electrode composition is low, it was difficult to control the volume expansion/contraction of a silicon-based active material, so fast-charging lifetime performance was reduced. Therefore, in the secondary batteries of Comparative Examples 5 and 6, since one negative electrode includes both a silicon-based active material and a carbon-based active material, it was not possible to adjust a negative electrode composition according to characteristics of each active material, so the secondary batteries of Comparative Examples 5 and 6 had lower fast-charging lifetime performance than the secondary batteries of Examples.

Experimental Example 3: Evaluation of Energy Density

The secondary batteries manufactured in Examples 1 to 3 and Comparative Examples 1 to 6 were charged and discharged under the following conditions for one cycle, and the discharge capacity (units: Wh) of the secondary batteries was measured.

In this case, after charging was completed, the thickness of each secondary battery was measured, and by multiplying the obtained secondary battery thickness by the area of the secondary battery, the volume (units: liter (L)) of the secondary battery was determined.

The discharge capacity of each secondary battery measured in the above was divided by the volume of the secondary battery to determine energy density (units: Wh/L). The results are shown in the following Table 4.

<Charging and Discharging Conditions>

Charging: CC/CV mode at 0.2 C up to 4.2 V, 5% cut-off

Discharging: CC mode at 0.2 C up to 3.2 V

TABLE 4

| | Energy density (Wh/L) |
|---|---|
| Example 1 | 537 |
| Example 2 | 521 |
| Example 3 | 543 |
| Comparative Example 1 | 554 |
| Comparative Example 2 | 506 |
| Comparative Example 3 | 480 |
| Comparative Example 4 | 428 |
| Comparative Example 5 | 490 |
| Comparative Example 6 | 449 |

Referring to Table 4, it can be seen that since the secondary batteries of Examples 1 to 3 include a silicon-based active material, the secondary batteries have improved capacity and, accordingly, excellent energy density.

In the case of Comparative Example 1, since the negative electrode included only a silicon-based active material as an active material, capacity was improved, and energy density was high. However, when only a silicon-based active material was used as a negative electrode active material as described above, since a high potential was formed in the positive electrode due to the high potential of the silicon-based active material, it can be seen that Comparative Example 1 had lower lifespan performance than Examples due to an increase in resistance.

In addition, in the case of the secondary batteries of Comparative Examples 2 to 4, the energy density of the secondary batteries was low due to an excessively high proportion of a negative electrode including a carbon-based active material having a low energy density.

In addition, in the case of the secondary battery of Comparative Example 5, although the energy density was increased to some extent because the negative electrode included a silicon-based active material, since the binder content of the negative electrode was high, the resistance of a carbon-based active material increased. In this case, since the resistance of a carbon-based active material increased, capacity was reduced, and thus energy density was reduced.

In addition, in the case of Comparative Example 6, it was difficult to control the volume expansion of a silicon-based active material due to a low binder content of a negative electrode composition. In this case, since it was difficult to control the thickness change of the negative electrode, energy density was lowered.

DESCRIPTION OF REFERENCE NUMERALS

1: secondary battery
100: positive electrode
110: positive electrode current collector
120: positive electrode active material layer
200: first negative electrode
210: first negative electrode current collector
220: first negative electrode active material layer
300: second negative electrode
310: second negative electrode current collector
320: second negative electrode active material layer
400: separator

The invention claimed is:

1. A secondary battery comprising:

one or more positive electrodes including a positive electrode active material layer;

a plurality of negative electrodes including:

a first negative electrode including a silicon-based active material, and a second negative electrode including a carbon-based active material, wherein the first negative electrode does not include the carbon-based active material, wherein the second negative electrode does not include the silicon-based active material;

separators; and an electrolyte, wherein one or more positive electrodes and the first or second negative electrode are alternately stacked with the separators interposed therebetween, and a weight ratio of a total weight of the silicon-based active material of the first negative electrode to a total weight of the carbon-based active material of the second negative electrode in the plurality of negative electrodes is in a range of 49.2:50.8 to 90:10.

2. The secondary battery of claim 1, wherein the first negative electrode includes a first negative electrode current collector, and a first negative electrode active material layer disposed on one or more surfaces of the first negative electrode current collector, and the first negative electrode active material layer includes the silicon-based active material.

3. The secondary battery of claim 2, wherein the first negative electrode active material layer further includes:

a first negative electrode binder, and a first negative electrode conductive material, and the first negative electrode active material layer includes:

60 wt % to 90 wt % of the silicon-based active material, 5 wt % to 30 wt % of the first negative electrode binder, and 5 wt % to 20 wt % of the first negative electrode conductive material.

4. The secondary battery of claim 3, wherein the first negative electrode binder includes at least one selected from the group consisting of styrene-butadiene rubber, acrylonitrile-butadiene rubber, acrylic rubber, butyl rubber, fluororubber, polyvinyl alcohol, carboxymethyl cellulose, starch, hydroxypropyl cellulose, polyvinyl alcohol, polyacrylic acid, polyethylene glycol, polyacrylonitrile, and polyacrylamide.

5. The secondary battery of claim 2, wherein a $N_1/P$ ratio calculated by Mathematical Equation a is in a range of 2.2 to 3.0:

$$N_1/P\ \text{ratio} = \{(\text{Discharge capacity per unit area of one first negative electrode active material layer in the first negative electrode})/(\text{Discharge capacity per unit area of one positive electrode active material layer in the positive electrode})\}. \quad \text{[Mathematical Equation a]}$$

6. The secondary battery of claim 1, wherein the silicon-based active material includes a compound represented by Chemical Formula 1:

$$SiO_x, \quad \text{[Chemical Formula 1]}$$

wherein, in Chemical Formula 1, $0 \le x < 2$.

7. The secondary battery of claim 1, wherein the silicon-based active material includes Si.

8. The secondary battery of claim 1, wherein an average particle diameter ($D_{50}$) of the silicon-based active material is in a range of 1 μm to 10 μm.

9. The secondary battery of claim 1, wherein the second negative electrode includes a second negative electrode current collector and a second negative electrode active material layer disposed on one or more surfaces of the second negative electrode current collector, and the second negative electrode active material layer includes the carbon-based active material.

10. The secondary battery of claim 9, wherein the second negative electrode active material layer further includes:

a second negative electrode binder, and a second negative electrode conductive material, and the second negative electrode active material layer includes:

90 wt % to 99 wt % of the carbon-based active material, 0.5 wt % to 10 wt % of the second negative electrode binder, and 0.5 wt % to 5 wt % of the second negative electrode conductive material.

11. The secondary battery of claim 10, wherein the second negative electrode binder includes at least one selected from the group consisting of a polyvinylidene fluoride-hexafluoropropylene copolymer, polyvinylidene fluoride, polyacrylonitrile, poly(methyl methacrylate), polyvinyl alcohol, carboxymethyl cellulose, starch, hydroxypropyl cellulose, polyvinylpyrrolidone, polytetrafluoroethylene, polyethylene, polypropylene, polyacrylic acid, ethylene-propylene-diene monomer rubber, styrene-butadiene rubber, and fluororubber.

12. The secondary battery of claim 1, wherein the carbon-based active material includes at least one selected from the group consisting of artificial graphite, natural graphite, hard carbon, soft carbon, carbon black, graphene, and fibrous carbon.

13. The secondary battery of claim 1, wherein an average particle diameter ($D_{50}$) of the carbon-based active material is in a range of 10 μm to 30 μm.

14. The secondary battery of claim 9, wherein a $N_2/P$ ratio calculated by Mathematical Equation b is in a range of 1.0 to 1.3:

$$N_2/P\text{ ratio} = \{(\text{Discharge capacity per unit area of one second negative electrode active material layer in the second negative electrode})/(\text{Discharge capacity per unit area of one positive electrode active material layer in the positive electrode})\}$$ [Mathematical Equation b]

15. The secondary battery of claim 1, wherein a $N_{all}/P_{all}$ ratio calculated by Mathematical Equation c is in a range of 2 to 3:

$$N_{all}/P_{all}\text{ ratio} = \{(\text{Sum of discharge capacity per unit area of the negative electrodes present in the secondary battery})/(\text{Sum of discharge capacity per unit area of the positive electrode present in the secondary battery})\}$$ [Mathematical Equation c]

* * * * *